United States Patent
Kuo et al.

(10) Patent No.: US 7,870,378 B2
(45) Date of Patent: Jan. 11, 2011

(54) ELECTRONIC SYSTEM WITH NAND FLASH MEMORY STORING BOOT CODE AND HIGHLY RELIABLE BOOT UP METHOD

(75) Inventors: Yu-Hao Kuo, Taipei (TW); Chi-Houn Ma, Taichung (TW); Yu-Ting Cheng, Nantou (TW); Chun-Chieh Huang, Taipei (TW); Hua-Lin Chang, Hsinchu (TW)

(73) Assignee: Magic Pixel Inc., Hsinchu (TW)

( * ) Notice: Subject to any disclaimer, the term of this patent is extended or adjusted under 35 U.S.C. 154(b) by 672 days.

(21) Appl. No.: 11/905,643

(22) Filed: Oct. 3, 2007

(65) Prior Publication Data

US 2008/0082814 A1    Apr. 3, 2008

(30) Foreign Application Priority Data

Oct. 3, 2006 (TW) .............................. 95136771 A

(51) Int. Cl.
*G06F 15/177* (2006.01)
*G06F 9/00* (2006.01)
*G06F 3/00* (2006.01)
*G06F 13/00* (2006.01)
*G06F 12/00* (2006.01)
*G06F 11/00* (2006.01)
*G11C 17/00* (2006.01)
*G11C 7/00* (2006.01)

(52) U.S. Cl. ................. 713/2; 713/1; 710/10; 710/104; 711/102; 711/166; 711/170; 714/36; 714/48; 714/746; 714/799; 365/94; 365/189.2

(58) Field of Classification Search ...................... 713/1, 713/2; 710/10, 104; 711/102, 166, 170; 714/36, 48, 746, 799; 365/94, 189.2
See application file for complete search history.

(56) References Cited

U.S. PATENT DOCUMENTS

| | | | |
|---|---|---|---|
| 6,421,792 B1 * | 7/2002 | Cromer et al. | 714/36 |
| 6,584,559 B1 * | 6/2003 | Huh et al. | 713/2 |
| 7,523,350 B2 * | 4/2009 | Lintz et al. | 714/36 |
| 7,555,678 B2 * | 6/2009 | Lai et al. | 714/36 |
| 2004/0158702 A1 * | 8/2004 | Tasaki | 713/2 |
| 2007/0239977 A1 * | 10/2007 | Wu | 713/2 |

FOREIGN PATENT DOCUMENTS

CN         1514970 A        7/2004

* cited by examiner

*Primary Examiner*—Stefan Stoynov
(74) *Attorney, Agent, or Firm*—Bacon & Thomas, PLLC

(57) ABSTRACT

A boot up method makes an electronic system boot up by a processor according to a boot code in a NAND flash memory and includes the following steps. First, the flash memory storing a boot code or boot codes is provided. Next, a first boot code is copied to an XIP memory in response to a hardware reset signal. Then, the processor executes the first boot code in the XIP memory and thus makes the system boot up. Next, whether the system boots up successfully is judged after a time delay. When the system fails to boot up, the system is reset and a second boot code is copied to the XIP memory. Thereafter, the processor executes the second boot code in the XIP memory and thus boots up the system. If the system still fails to boot up, the above-mentioned steps are repeated until the system boots up successfully.

3 Claims, 2 Drawing Sheets

ELECTRONIC SYSTEM WITH NAND FLASH MEMORY STORING BOOT CODE AND HIGHLY RELIABLE BOOT UP METHOD

This application claims the benefit of Taiwan application Serial No. 95136771, filed Oct. 3, 2006, the subject matter of which is incorporated herein by reference.

BACKGROUND OF THE INVENTION

1. Field of the Invention

The invention relates in general to an electronic system, and more particularly to an electronic system having a NAND flash memory for storing a boot code, which is for booting up the system.

2. Description of the Related Art

A conventional electronic system has a NAND flash memory for storing a boot code. When the electronic system boots up, the boot code in the NAND flash memory is copied to an execute-in-place (XIP) memory, and a processor of the electronic system executes the boot code in the XIP memory to make the electronic system boot up. However, the problem of bit damage tends to occur after the NAND flash memory is repeatedly used for a long time. Thus, when some bits of the boot code are damaged, the conventional electronic system having the NAND flash memory for storing the boot code cannot boot up due to the damage of the boot code.

SUMMARY OF THE INVENTION

The invention is directed to an electronic system having a NAND flash memory for storing a boot code, and a boot up method thereof. The electronic system of the invention can effectively improve the drawback that the conventional electronic system cannot boot up due to the damage of the NAND flash memory.

According to a first aspect of the present invention, an electronic system is provided. The electronic system includes an execute-in-place (XIP) memory, a processor, a NAND flash memory, a NAND flash memory controller, a sequencer and a timer. The processor is coupled to the XIP memory and executes a program code in the XIP memory. The NAND flash memory includes a first memory block for storing a first copy boot code and a second memory block for storing a second copy boot code, which is identical to the first boot code and may provide a complete boot up procedure. The NAND flash memory controller controls the operation of reading the NAND flash memory and copies the program code in the NAND flash memory to the XIP memory. The sequencer controls the NAND flash memory controller to copy the first boot code to the XIP memory in response to a hardware reset signal. Thus, the processor executes the first boot code in the XIP memory to make the electronic system boot up. The timer delays a specific time delay in response to the hardware reset signal, detects whether the electronic system successfully boots up after the specific time delay and then judges whether the sequencer has to make the electronic system rebooting. When the electronic system fails to boot up, the timer will reset the electronic system and the sequencer controls the NAND flash memory controller to copy the second boot code to the XIP memory. The processor executes the second boot code in the XIP memory to make the electronic system boot up.

According to a second aspect of the present invention, a boot up method of an electronic system is provided. The method makes the electronic system boot up by a processor according to a boot code in a NAND flash memory. The method includes the following steps. First, the NAND flash memory storing a first boot code and a second boot code is provided. Next, the first boot code is copied to the XIP memory in response to a hardware reset signal. Then, the processor executes the first boot code in the XIP memory and makes the electronic system boot up. Next, it is judged whether the electronic system successfully boots up after a specific time delay. Then, the electronic system is reset and the second boot code is copied to the XIP memory when the electronic system still fails to boot up. Next, the processor executes the second boot code in the XIP memory to make the electronic system boot up. There could be more than two copies of boot codes in the NAND flash memory to further improve the successful rate.

The invention will become apparent from the following detailed description of the preferred but non-limiting embodiments. The following description is made with reference to the accompanying drawings.

DETAILED DESCRIPTION OF THE INVENTION

An electronic system according to the invention has a NAND flash memory for storing at least two copies of boot codes. The electronic system of the invention further has a sequencer for making the electronic system boot up using the other boot code when one of the boot codes is damaged.

Figure 1:
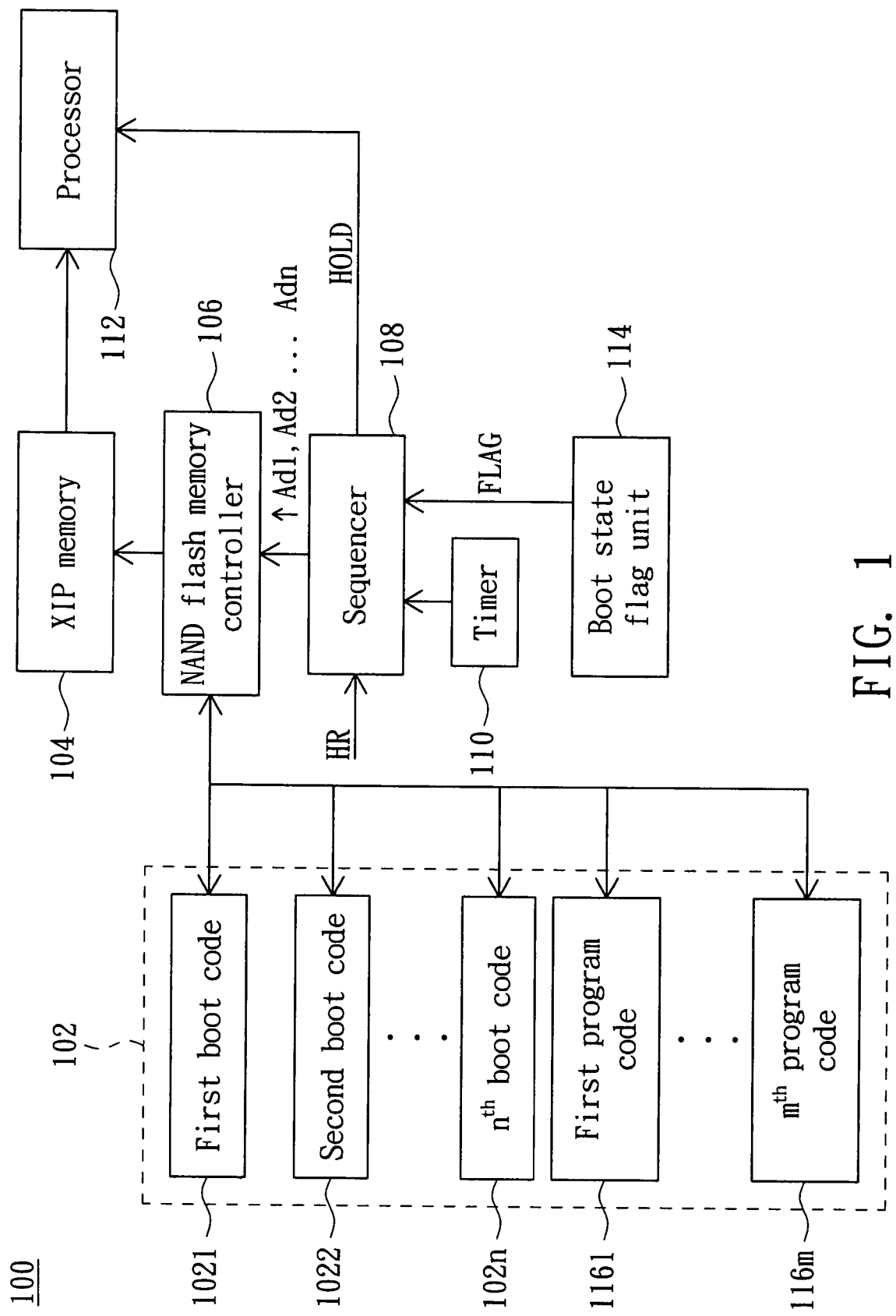
FIG. 1 is a block diagram showing an electronic system having a NAND flash memory for storing a boot code according to a preferred embodiment of the invention.

FIG. 1 is a block diagram showing an electronic system 100 having a NAND flash memory for storing a boot code according to a preferred embodiment of the invention. Referring to FIG. 1, the electronic system 100 includes a NAND flash memory 102, an execute-in-place (XIP) memory 104, a NAND flash memory controller 106, a sequencer 108, a timer 110 and a processor 112.

The NAND flash memory 102 which allocates a first, a second, . . . , and a $n^{th}$ boot code storing memory blocks (not shown) for storing a first boot code 1021, a second boot code 1022, . . . , and an $n^{th}$ boot code 102$n$, respectively, wherein n is a natural number greater than 1, and the first to $n^{th}$ boot codes 1021 to 102$n$ are substantially identical and each boot code can be used to execute a complete booting procedure. The NAND flash memory controller 106 controls an operation of reading the NAND flash memory 102 and copies a program code in the NAND flash memory 102 to the XIP memory 104. The processor 112 is coupled to the XIP memory 104 and executes the program code in the XIP memory 104.

The sequencer 108 controls the NAND flash memory controller 106 to copy the first boot code 1021 in the first boot code storing memory block to the XIP memory 104 in response to a hardware reset signal HR, and the processor 112 executes the first boot code 1021 in the XIP memory 104 to make the electronic system 100 boot up. The timer 110 also delays a specific time delay in response to the hardware reset signal HR and then enables the sequencer 108 to detect whether the processor 112 makes the electronic system 100 successfully boot up according to the first boot code 1021 after the specific time delay. The length of the specific time delay is greater than that of the sum of the time for copying the boot code of the NAND flash memory controller 106 to the XIP memory 104 and the time for the processor 112 to execute the boot code to complete the boot up operation of the electronic system 100.

When the processor 112 fails to boot up according to the first boot code 1021, the sequencer 108 makes the electronic system 100 reboot, resets the electronic system 100 and the timer 110, and controls the NAND flash memory controller 106 to copy the second boot code 1022 in the second boot code storing memory block to the XIP memory 104. The processor 112 executes the second boot code 1022 in the XIP memory 104 to make the electronic system 100 booting up. The timer 110 also delays the specific time delay after the reset operation and then enables the sequencer 108 to detect whether the electronic system 100 successfully boots up.

When the processor 112 still fails to boot up according to the second boot code 1022, the sequencer 108 again makes the electronic system reboot, resets the electronic system 100 and the timer 110 and controls the NAND flash memory controller 106 to copy the third boot code 1023 in the third boot code storing memory block to the XIP memory 104. In addition, the processor 112 executes the third boot code 1023 in the XIP memory 104 to make the electronic system 100 booting up. The timer 110 also delays the specific time delay after the reset operation and then enables the sequencer 108 to detect whether the electronic system 100 successfully boots up. The sequencer 108 repeats the above-mentioned process of making the electronic system 100 reboot until the sequencer 108 detects that the processor 112 makes the electronic system 100 successfully boot up.

The electronic system 100 further includes a boot status flag unit 114 for outputting a signal FLAG. In the illustrated example of this embodiment, the boot status flag unit 114 outputs the signal FLAG to the sequencer 108, and the sequencer 108 judges whether the electronic system 100 successfully boots up according to a signal level of the signal FLAG. The signal FLAG has an initial level which indicates system is not booted up yet. When the processor 112 executes one of the first to n boot codes 1021 to 102$n$ to make the electronic system 100 completely boot up, the processor 112 further set the level of the signal FLAG from the initial level to a terminating level which indicates the system is completely booted up.

Thus, when the sequencer 108 detects that the signal level of the signal FLAG is the initial level, it represents that the processor 112 cannot make the electronic system 100 finish booting up using the boot code in the XIP memory 104 so that the signal level of the signal FLAG cannot be set to the terminating level (i.e., the electronic system 100 fails to boot up). At this time, the sequencer 108 makes the electronic system 100 reboot so that the processor 112 makes the electronic system 100 boot up using the next boot code in the next boot code storing memory block. When the sequencer 108 detects that the signal level of the signal FLAG is the terminating level, it represents that the processor 112 makes the electronic system 100 finish booting up.

The NAND flash memory 102 of this embodiment further includes a first, a second, . . . , and a m$^{th}$ program code storing memory blocks (not shown) for respectively storing multiple application program codes 1161 to 116$m$, wherein m is a natural number greater than 1. When the sequencer 108 detects that the electronic system 100 successfully boots up, it controls the NAND flash memory controller 106 to copy one on the application program codes 1161 to 116$m$ to the XIP memory 104, and the processor 112 executes other application operations of the electronic system 100 according to the application program code in the XIP memory 104.

In this embodiment, for example, the memory size of the boot code storing memory blocks of the NAND flash memory 102 may be the same, the boot code storing memory blocks are neighboring memory blocks, and the initial address of the memory block 1021 is 0. The sequencer 108 outputs address signals Ad1 to Adn to the NAND flash memory controller 106 to control the NAND flash memory controller 106 to read the first to n$^{th}$ boot codes 1021 to 102$n$ respectively stored in the boot code storing memory blocks, and to control the NAND flash memory controller 106 to copy the first to n$^{th}$ boot codes 1021 to 102$n$ to the XIP memory 104. For example, the address signals Ad1 to Adn respectively correspond to the initial addresses of the boot code storing memory blocks, and the sequencer 108 generates Ad1 to Adn according to the boot failure count.

The sequencer 108 of this embodiment further outputs a pause signal HOLD to the processor 112 when the NAND flash memory controller 106 is copying one of the first to n$^{th}$ boot codes 1021 to 102$n$ to the XIP memory 104 so as to pause the operation of the processor 112 when the boot code is being copied to XIP memory 104. The sequencer 108 further disables the signal HOLD to enable the processor 112 to operate normally and to execute the boot codes in the XIP memory 104 to make the electronic system 100 boot up after the NAND flash memory controller 106 has copied one of the first to n$^{th}$ boot codes to the XIP memory 104.

Figure 2:
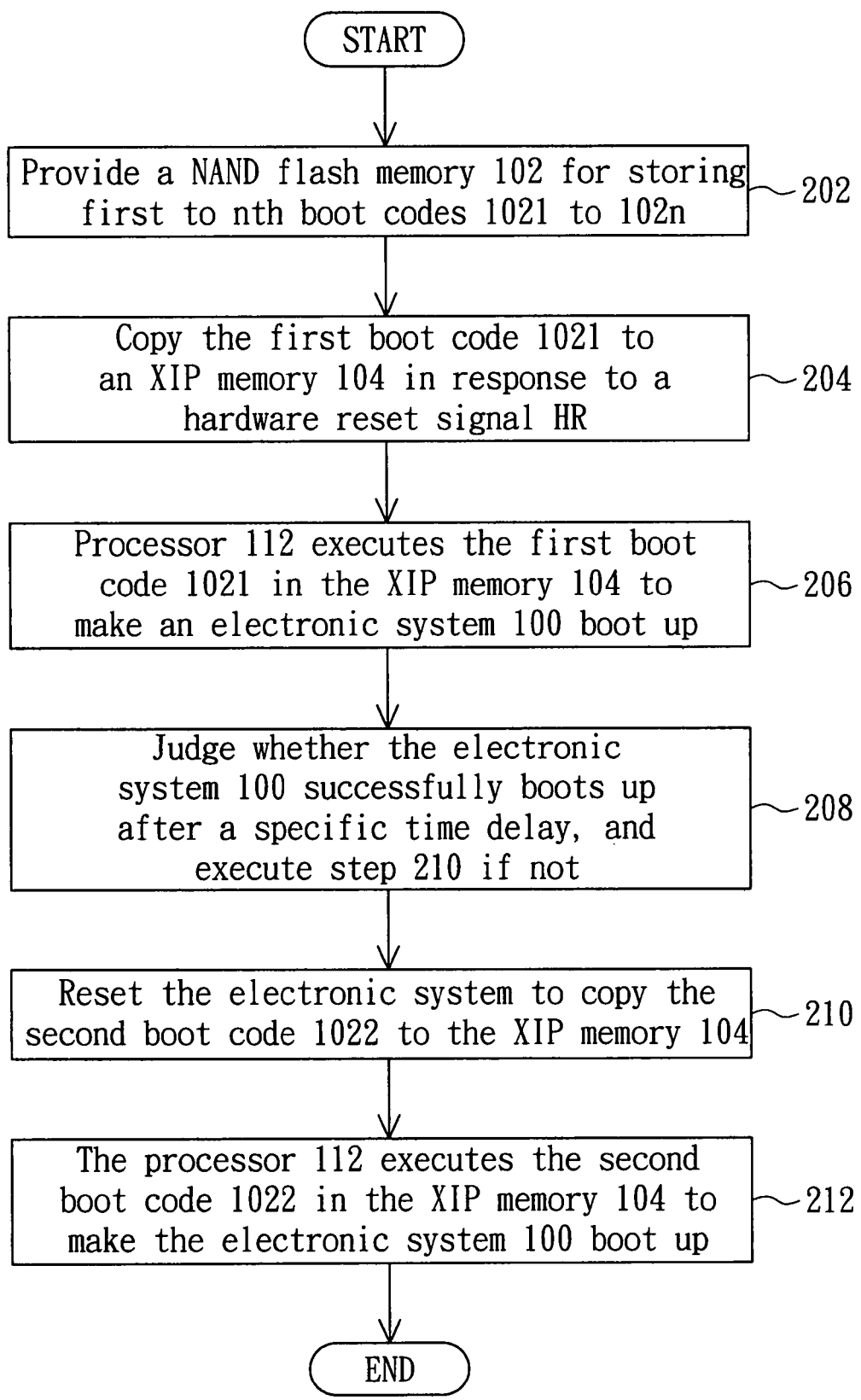
FIG. 2 is a flow chart showing a boot up method of the electronic system 100 of FIG. 1.

FIG. 2 is a flow chart showing a boot up method of the electronic system 100 of FIG. 1. The boot up method of this embodiment includes the following steps.

First, as shown in step 202, the NAND flash memory 102 having the boot code storing memory blocks for respectively storing the first to n$^{th}$ boot codes 1021 to 102$n$ is provided.

Next, as shown in step 204, the first boot code 1021 is copied to the XIP memory 104 in response to the hardware reset signal HR, and the operation of the processor 112 is paused.

Then, as shown in step 206, the processor 112 executes the first boot code 1021 in the XIP memory 104 to make the electronic system 100 boot up.

Next, as shown in step 208, it is judged whether the electronic system 100 successfully boots up after the specific time delay, and step 210 is executed if not.

Then, as shown in step 210, the electronic system 100 is reset, the second boot code 1022 is copied to the XIP memory 104, and the operation of the processor 112 is paused.

Thereafter, as shown in step 212, the processor 112 executes the second boot code 1022 in the XIP memory 104 to make the electronic system 100 boot up. Next, if the electronic system 100 still fails to boot up, steps 208 to 212 are repeated to enable the processor 112 to execute third to n$^{th}$ boot codes 1023 to 102$n$ to make the electronic system 100 booting up until the electronic system 100 successfully boots up.

In the illustrated example of this embodiment, the signal FLAG is connected to the sequencer 108 to enable the sequencer 108 to detect whether the electronic system 100 successfully boots up. However, the signal FLAG is not only used by the sequencer 108 but may further be used by the timer 110 to terminate the counting operation of the timer 110 when the signal level of the signal FLAG is the terminating level. The sequencer 108 judges whether the electronic system 100 successfully boots up according to whether the counting operation of the timer 110 terminates. If the counting operation of the timer 110 is terminated by the signal FLAG, it represents that the electronic system 100 successfully boots up; and if the counting operation of the timer 110 is not terminated by the signal FLAG, it represents that the electronic system fails to boot up.

In the electronic system and the boot up method of the embodiment, multiple boot codes are stored in the NAND flash memory and the sequencer is provided to make the system boot up according to a next boot code when the boot code is damaged. Thus, the electronic system and the boot up method of this embodiment can effectively solve the problem that the conventional electronic system only has one boot code stored in the NAND flash memory, and cannot boot up when the boot code storing memory block is damaged. In addition, when the number of boot codes stored in the NAND flash memory of the electronic system of this embodiment is large enough, the boot up successful rate of the electronic system can be substantially improved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic system, comprising:
    an execute-in-place (XIP) memory;
    a processor for executing an application program code in the XIP memory;
    a NAND flash memory for storing a plurality of boot codes which are identical to one another;
    a NAND flash memory controller for controlling an operation of reading the NAND flash memory and copying one of the plurality of boot codes in sequential manner in the NAND flash memory to the XIP memory;
    a sequencer for controlling the NAND flash memory controller to copy a first boot code to the XIP memory in response to a hardware reset signal, wherein the processor executes the first boot code in the XIP memory to make the electronic system boot up; and
    a timer for delaying a specific time delay in response to the hardware reset signal, enabling the sequencer to judge whether the electronic system successfully boots up after the specific time delay, and then judging whether the sequencer has to make the electronic system reboot;
    a boot status flag unit for outputting a flag signal to the sequencer, wherein the sequencer judges whether the electronic system successfully boots up according to a signal level of the flag signal;
    wherein the flag signal has an initial level, and when the signal level of the flag signal is the initial level, the flag signal indicates that the electronic system has not successfully booted up;
    wherein when the electronic system fails to boot up, the sequencer makes the electronic system reset and controls the NAND flash memory controller to copy a next available boot code in NAND Flash memory to the XIP memory, and the processor executes the next available boot code in the XIP memory to make the electronic system boot up, and
    wherein after the electronic system boots up, the sequencer controls the NAND flash memory controller to copy said application program code to the XIP memory for execution by the processor, and the processor sets the signal level of the flag signal to a terminating level to represent that the electronic system successfully boots up.

2. The system according to claim 1, wherein the sequencer outputs a start address signal corresponding to the next available boot code in the NAND memory and controls the NAND flash memory controller to copy the next available boot code into the XIP memory.

3. The system according to claim 1, wherein the sequencer pauses the processor when the NAND flash memory controller is copying the next available boot code into the XIP memory;
    wherein the sequencer further disables the pause signal and enables the processor to execute the next available boot code to boot up the electronic system.

* * * * *